United States Patent
Fidler et al.

(10) Patent No.: US 9,824,137 B2
(45) Date of Patent: Nov. 21, 2017

(54) BLOCK ZOOM ON A MOBILE ELECTRONIC DEVICE

(75) Inventors: Eli Joshua Fidler, Toronto (CA); Matthew Nicholaos Staikos, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 1379 days.

(21) Appl. No.: 13/530,411

(22) Filed: Jun. 22, 2012

(65) Prior Publication Data

US 2013/0117658 A1 May 9, 2013

Related U.S. Application Data

(60) Provisional application No. 61/557,121, filed on Nov. 8, 2011.

(51) Int. Cl.
- *G06F 17/24* (2006.01)
- *G06F 17/30* (2006.01)
- *G06F 17/25* (2006.01)

(52) U.S. Cl.
CPC ................. *G06F 17/3061* (2013.01)

(58) Field of Classification Search
CPC ..................................... G06F 17/217
USPC .................................................. 715/234
See application file for complete search history.

(56) References Cited

U.S. PATENT DOCUMENTS

| | | | |
|---|---|---|---|
| 4,642,790 A * | 2/1987 | Minshull | G09G 5/14 345/672 |
| 5,754,873 A * | 5/1998 | Nolan | G06F 3/0481 345/472 |
| 6,346,938 B1 | 2/2002 | Chan et al. | |
| 6,788,293 B1 * | 9/2004 | Silverbrook | B41J 3/445 235/454 |
| 6,950,993 B2 | 9/2005 | Breinberg | |
| 7,222,306 B2 | 5/2007 | Kaasila et al. | |
| 7,412,647 B2 * | 8/2008 | Sellers et al. | 715/253 |
| 7,415,666 B2 | 8/2008 | Sellers et al. | |
| 7,479,949 B2 | 1/2009 | Jobs et al. | |
| 7,487,444 B2 | 2/2009 | Lira | |
| 7,516,402 B2 | 4/2009 | Koivisto et al. | |

(Continued)

OTHER PUBLICATIONS

Ishak, E. W., Feiner, S. K, "Content-Aware Scrolling", UIST'06, Oct. 15-18, 2006, Montreux, Switzerland. Copyright 2006 ACM 1-59593-313-1/06/0010, pp. 1-4.
Extended European Search Report dated Nov. 6, 2012 from EP12173135.0, 6 pgs.
Sherstyuk A et al: "Poster: Sliding Viewport for Head Mounted Displays in Interactive Environments", 3D User Interfaces, 2888 IEEE Symposium On, IEEE, Piscataway, NJ, USA, Mar. 8, 2888 (2888-83-88), pp. 135-136, XP831339893, ISBN: 978-1-4244-2847-6.

(Continued)

*Primary Examiner* — James J Debrow
(74) *Attorney, Agent, or Firm* — Rowand LLP

(57) ABSTRACT

A device, system and method are provided for processing structured documents, such as webpages, for display. Various elements within the structured document are parsed and rendered by an electronic device for outputting to an external or integrated display. In response to a detected scaling instruction, such as a zoom in instruction, a selected region of the displayed document indicated by the instruction is scaled to a first scaled size, including any text content therein. Any text content contained within the region may be reflowed according to the bounds of its containing element or a viewport. A dominant alignment is determined from the element or elements contained within the selected region, and the portion of the scaled region to be output to the display is determined based on the dominant alignment.

28 Claims, 9 Drawing Sheets

(56) References Cited

U.S. PATENT DOCUMENTS

| | | |
|---|---|---|
| 7,792,876 B2 | 9/2010 | Easwar |
| 2003/0137522 A1* | 7/2003 | Kaasila et al. ................ 345/619 |
| 2004/0183817 A1* | 9/2004 | Kaasila ........................ 345/660 |
| 2008/0077880 A1* | 3/2008 | Oygard ........................ 715/799 |
| 2009/0189920 A1 | 7/2009 | Chiu et al. |
| 2009/0319888 A1 | 12/2009 | Oygard |
| 2010/0029340 A1 | 2/2010 | Klassen et al. |
| 2010/0066694 A1 | 3/2010 | Jonsdottir |
| 2010/0271288 A1* | 10/2010 | Srinivasan ............ G06F 3/1454 |
| | | 345/2.2 |
| 2011/0035274 A1 | 2/2011 | Goel et al. |
| 2011/0119620 A1 | 5/2011 | Schön et al. |
| 2011/0202829 A1 | 8/2011 | Klassen et al. |
| 2011/0209047 A1* | 8/2011 | Olsen et al. .................. 715/234 |
| 2012/0096343 A1* | 4/2012 | Beck ..................... G06F 3/0484 |
| | | 715/243 |
| 2012/0311487 A1* | 12/2012 | Staikos et al. ................ 715/800 |
| 2013/0067390 A1* | 3/2013 | Kwiatkowski ........ G06F 9/4443 |
| | | 715/784 |

OTHER PUBLICATIONS

CIPO, CA Office Action relating to Application No. 2, 781, 298, dated May 20, 2015.
EPO, EP Examination Report relating to Application No. 12173135.0, dated Feb. 12, 2016.

* cited by examiner

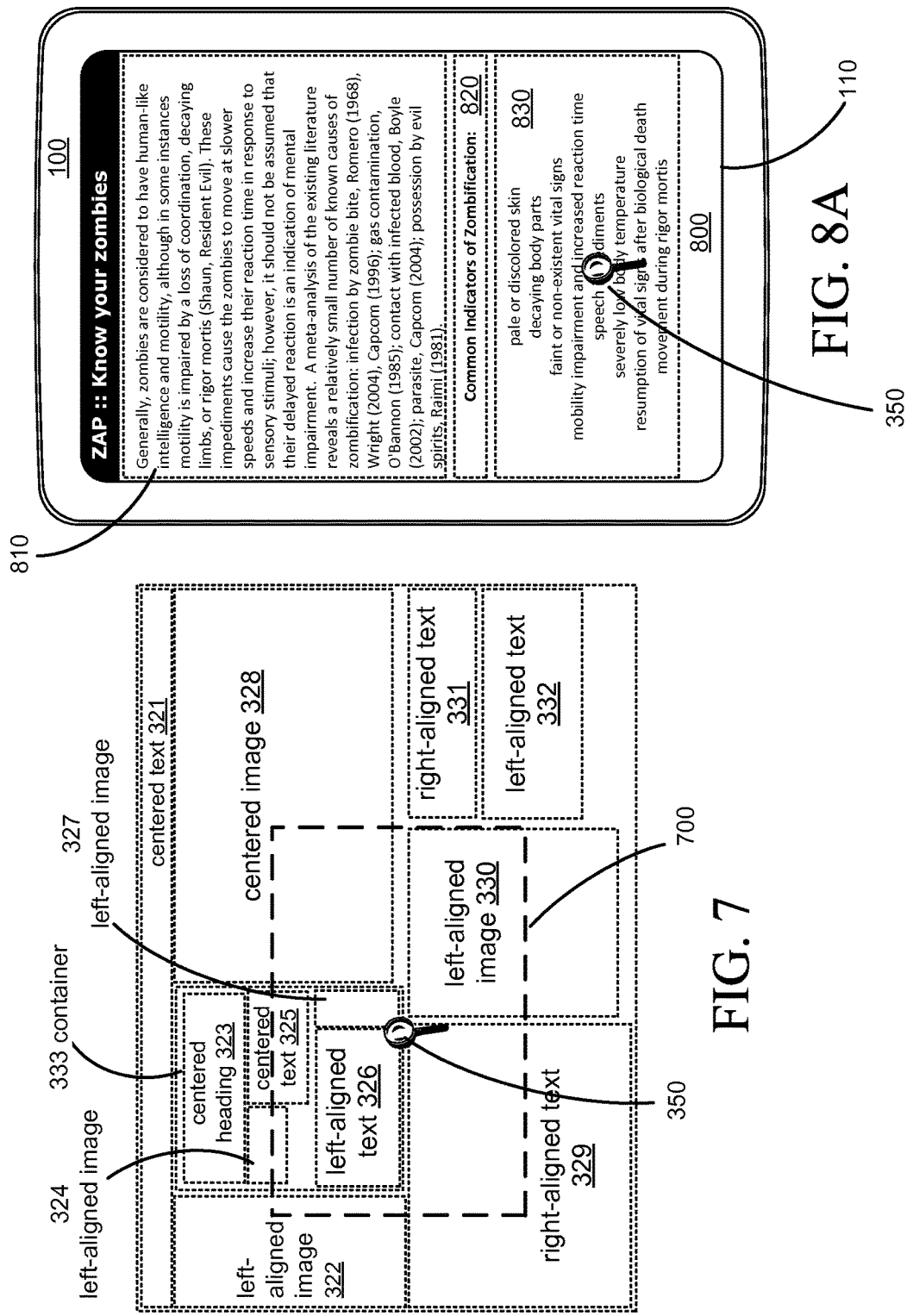

BLOCK ZOOM ON A MOBILE ELECTRONIC DEVICE

CROSS-REFERENCE TO RELATED APPLICATIONS

The present application claims priority to U.S. Provisional Application No. 61/557,121 filed on 8 Nov. 2011, the entirety of which is incorporated herein by reference.

BACKGROUND

1. Technical Field

The present application relates to the display and magnification of structured document elements.

2. Description of the Related Art

Web browsers, word processors, e-book readers, file viewers and similar applications are used to present structured documents, webpages, HTML files, and the like, for display by an electronic device. When rendered for display, the structured document can include text and other elements that, as originally presented on an electronic device display, are inconveniently sized or scaled; the elements may be displayed at too small a size to be generally considered legible, or they may be scaled up to a size that takes up too much of the available display area. This is particularly the case with portable computing devices such as tablet computers, smartphones, and similar devices, which are typically equipped with smaller display screens than desktop computers, external monitors, and other electronic devices that might be configured to process structured documents.

BRIEF DESCRIPTION OF THE DRAWINGS

In drawings which illustrate by way of example only embodiments of the present application and in which like reference numerals describe similar items throughout the various figures.

FIG. 7 is a further schematic diagram of the structured document of FIG. 3A and a zoom region.

FIG. 8A is an illustration of a further structured document as presented in a display.

DETAILED DESCRIPTION OF THE INVENTION

The embodiments herein provide improved devices, systems, methods and computer program products for rendering and displaying structured documents, such as webpages, and scaling (in particular, enlarging or zooming in on) a region of the structured document for display.

In this disclosure, the terms "scale", "scaling", "zoom" and "zooming" are used throughout to refer to increasing and decreasing the size of a rendered structured document or an element or region thereof for display, where "scale up", "scaling up", "zoom in" and "zooming in" refer to increasing the displayed size, and "scale down", "scaling down", "zoom out", and "zooming out" refer to decreasing the displayed size. Synonymous terminology, such as "magnification", may be employed, and will be known to and readily understood by those skilled in the art.

These embodiments will be described and illustrated primarily in relation to electronic devices adapted to process input files for display via a display interface, optionally including an integrated display screen. Examples of such electronic devices include tablet computing devices and smartphones. It will be appreciated by those skilled in the art, however, that this description is not intended to limit the scope of the described embodiments to implementation on these particular types of devices. The embodiments described herein may be applied to any appropriate electronic device, which may be adapted to communicate with another electronic device over a fixed or wireless connection, whether portable or wirelessly enabled or not, and whether provided with voice communication capabilities or not. The electronic device can be adapted to process data and carry out operations on data in response to user commands for any number of purposes, including productivity and entertainment. Thus, the embodiments described herein may be implemented on electronic devices adapted for content browsing, communication or messaging, including without limitation the above-mentioned tablets and smartphones as well as cellular phones, wireless organizers, personal digital assistants, desktop computers, terminals, laptops, handheld wireless communication devices, notebook computers, ebook readers, entertainment devices such as MP3 or video players, and the like. Unless expressly stated, an electronic device may include any such device.

Figure 1:
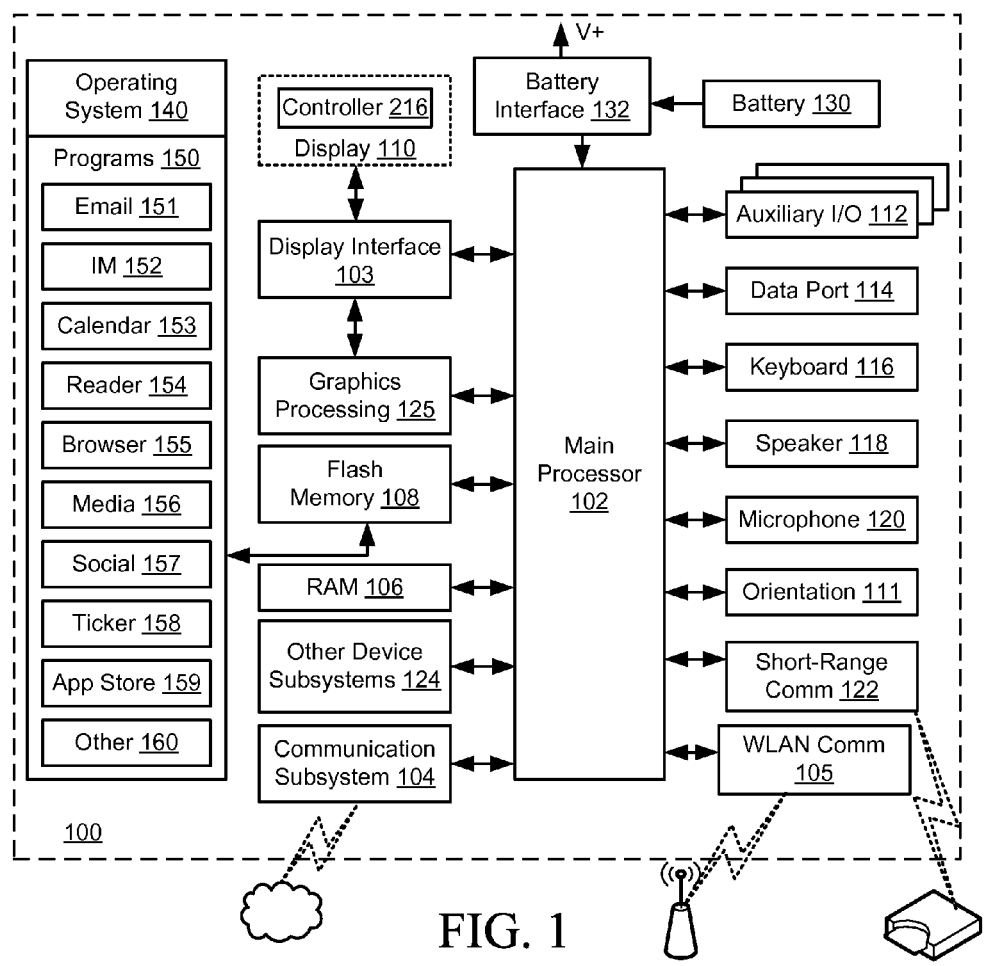
FIG. 1 is a block diagram of an embodiment of an electronic device for use with the embodiments described herein.

FIG. 1 is a block diagram of an example embodiment of an electronic device 100 that may be used with the embodiments described herein. The electronic device 100 includes a number of components such as a main processor 102 that controls the overall operation of the electronic device 100. It should be understood that the components described in FIG. 1 are optional and that an electronic device used with various embodiments described herein may include or omit components described in relation to FIG. 1.

The electronic device 100 may be a battery-powered device including a battery interface 132 for receiving one or more rechargeable batteries 130. Communication functions, including data and voice communications, are performed through one or more communication subsystems 104, 105, and/or 122 in communication with the processor 102. Data received by the electronic device 100 can be decompressed and decrypted by a decoder, operating according to any suitable decompression techniques, and encryption/decryption techniques according to one or more various encryption or compression standards known to persons of skill in the art.

If equipped with a communication subsystem 104, this subsystem 104 receives data from and sends data to a wireless network. In this embodiment of the electronic device 100, the communication subsystem 104 is configured in accordance with one or more wireless communications standards. New wireless communications standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for the wireless communications standard, and optionally other network communications.

The electronic device 100 may be provided with other communication subsystems, such as a wireless LAN (WLAN) communication subsystem 105 or a short-range and/or near-field communications subsystem 122 also shown in FIG. 1. The WLAN communication subsystem 105 may operate in accordance with a known network protocol such as one or more of the 802.11™ family of standards developed or maintained by IEEE. The communications subsystems 105 and 122 provide for communication between the electronic device 100 and different systems or devices without the use of the wireless network, over varying distances that may be less than the distance over which the communication subsystem 104 can communicate with the wireless network. The subsystem 122 can include an infrared device and associated circuits and/or other components for short-range or near-field communication.

It should be understood that any of the communication subsystems 104, 105, 122 may optionally be included in the electronic device 100. Alternatively, a communication subsystem provided in a dongle or other peripheral device (not shown) may be connected to the electronic device 100, either wirelessly or by a fixed connection such as a USB port, to provide the electronic device 100 with access to a network. If provided onboard the electronic device 100, the communication subsystems 104, 105 and 122 may be separate from, or integrated with, each other.

The main processor 102 also interacts with additional subsystems such as a Random Access Memory (RAM) 106, a flash memory 108, a display interface 103, other data and memory access interfaces such as an auxiliary input/output (I/O) subsystem 112 or a data port 114, a keyboard 116, a speaker 118, a microphone 120, the short-range communications 122 and other device subsystems 124. The communication device may also be provided with an accelerometer 111, which may be used to detect gravity- or motion-induced forces and their direction. Detection of such forces applied to the electronic device 100 may be processed to determine a response of the electronic device 100, such as an orientation of a graphical user interface displayed on a display 110 in response to a determination of the current orientation of the electronic device 100.

In some embodiments, the electronic device 100 may comprise an integral display screen as the display 110, shown in phantom in FIG. 1. For example, a handheld or portable electronic device 100 such as a tablet, laptop, or smartphone typically incorporates a display screen 110 in communication with the main processor 102 via the display interface 103, whereas other electronic devices 100 are connected to external monitors or screens using the display interface 103, as in the case of a desktop computer. However, smaller devices, such as the tablet, laptop or smartphone, may also be connected to external monitors or screens, in which case the display interface 103 represented in FIG. 1 includes an interface for connection of an external display device. Thus, as contemplated herein, the electronic device 100 may have an integrated display interface, or may be configured to output data to be painted to an external display unit such as an external monitor or panel, television screen, projector, or virtual retinal display (via a data port or transmitter, such as a Bluetooth® transceiver, other wireless transceiver, USB port, HDMI port, DVI port, and the like). References herein to a "display" and "display screen" are intended to encompass both integrated and external display units, and references to the "display interface" are intended to encompass interfaces for both integrated and external display units.

Further, in some embodiments, the display 110 may be a touchscreen-based device, in which the display 110 is a touchscreen interface that provides both a display for communicating information and presenting graphical user interfaces, as well as an input subsystem for detecting user input that may be converted to instructions for execution by the device 100. The display 110 may thus be the principal user interface provided on the electronic device 100, although in some embodiments, additional buttons, variously shown in the figures or a trackpad, or other input means may be provided. If a touchscreen is provided, then other user input means such as the keyboard 116 may or may not be present. The controller 216 and/or the processor 102 may detect a touch by any suitable contact member on the touch-sensitive display 110.

When a user specifies that a data file is to be outputted to the display interface 103, the data file is processed for display by the main processor 102. This processing may include, in the case of structured documents, parsing of the document to render the document or a portion thereof as an image file, which is then provided as output to the display interface 103 as discussed below. The main processor 102 may thus include a visualization subsystem, implemented in hardware, software, or a combination thereof, to process the data file for display.

Depending on the input data file, the processing carried out by the processor 102 in preparation for display may be relatively intensive, and the processing may consume a significant amount of processor time and memory. In particular, processing data files originally optimized or prepared for visualization on large-screen displays on a portable electronic device display often requires additional processing prior to visualization on the small-screen portable electronic device displays. Thus, the electronic device 100 may also be provided with a graphics processor module 125 separate from the main processor 102, again implementable in hardware, software, or a combination thereof. The graphics processor module 125 may comprise a dedicated image processor with associated circuitry, including memory 230 (shown in FIG. 2) that is separate from other memory in the electronic device 100, such as the RAM 106, flash memory 108, and any memory internal to the main processor 102.

The operation of such graphics processor modules will be known to those skilled in the art. Upon an application processing data file for display determining that the file includes content or transformations that are appropriately handled by the graphics processor module 125, those components of the file are provided to the graphics processor module 125 with associated commands for the rendering of that content for output to the display interface 103. The graphics processor module 125 can be configured to retrieve image files stored in device memory (such as RAM 106 or flash memory 108), or in its own resident memory 230, and to apply these image files as texture maps to surfaces defined in accordance with the received commands.

The electronic device 100 also includes an operating system 140 and software components 150 to 160 which are described in more detail below. It will be understood by those skilled in the art that for ease of exposition, only select operating system and program components are illustrated in FIG. 1. The operating system 140 and software components that are executed by the main processor 102 are typically stored in a persistent store such as the flash memory 108, which can alternatively be a read-only memory (ROM) or similar storage element (not shown). Those skilled in the art will appreciate that portions of the operating system 140, and the further software components 150 to 160, such as specific device applications, or parts thereof, can be temporarily loaded into a volatile store such as the RAM 106. Other software components can also be included, as is well known to those skilled in the art.

The subset of software applications (not shown) that control basic device operations, including data and voice communication applications, will normally be installed on the electronic device 100 during its manufacture and may be included with the operating system 140, although in some example embodiments these components may be provided and installed separately.

Programs 150 that may be provided for execution by the electronic device 100 can include messaging applications, including one or more of email programs 151 or one or more instant messaging (IM) programs 152. Other messaging applications for different messaging platforms, such as SMS, private or network messages, and the like, may also be included with the programs 150, as well as a unified message box application or function that provides a unified view of message or other content information associated with multiple user accounts or message types, and which serves as an entry point for access to other messaging services or applications executable on the device 100. The "unified message box" may also be known as a "unified inbox"; however, a unified message box in particular may contain inbound messages, outbound messages, or a combination thereof.

Productivity applications such as calendar applications 153, word processors, document viewers, spreadsheet programs, accounting programs, and the like may also be included, as well as other applications that may be used for productivity, entertainment or information purposes, such as feed/content readers 154, web browsers 155, media players 156 (which can include picture viewers, music players, and/or video players), social networking applications 157 (which can include messaging functions), news, weather, and other "ticker" applications 158. Further, other applications, such as the app store application 159, may be provided on the electronic device 100 to manage and track the download and installation of individual applications or applets on the electronic device 100. The app store application 159 may interface over a network with a single repository of available electronic device applications. The app store application 159 may further track the availability of updates for electronic device applications previously downloaded using the app store application 159 and present notifications at the electronic device 100 when updates are available for download. A variety of other device programs 160 may also be provided for execution on the device 100. Each of the applications 150 may be provided with a corresponding data store at the device 100 (for example, in the flash memory 108).

The individual applications 150 and operating system 140 components may be provided with associated data stores on the electronic device 100, typically in persistent memory such as the flash memory 108. Thus, for example, messages that have been sent or received by the user are typically stored in whole or in part in the flash memory 108 of the electronic device 100, and recently read content or webpages may be cached on the device 100 either in flash memory 108 or in RAM 106 for at least a current session of the reader 154 or browser application 155. In at least some example embodiments, some data generated and/or accessed by the various programs 150 or operating system 140 components can be stored at a remote location from the electronic device 100 such as in a data store of an associated host system (not shown in FIG. 1) with which the electronic device 100 communicates.

In use, a received signal such as a text message, an e-mail message, or webpage download will be processed by the receiving communication subsystem 104, 105, 122 and input to the main processor 102. The main processor 102 will then process the received signal for output via the display interface 103 or alternatively to the auxiliary I/O subsystem 112. A user can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over a wireless network through the communication subsystem 104. It will be appreciated that if the display 110 is a touchscreen, then the auxiliary subsystem 112 may still include one or more of the devices identified above.

As noted above, the embodiments described herein relate to the processing of structured documents for presentation on a display. Structured documents can include documents authored using an SGML or XML-compliant, XML-like, or XML-based markup language, which, as those skilled in the art will appreciate, includes HTML-based documents such as webpages, and also includes web applications, other rich media applications, and widgets. The structured documents may include or be delivered in association with other elements such as scripts or rich media files, which can be delivered together with the structured document to the electronic device 100, or downloaded separately by the application for use when the structured document is rendered for display. These structured documents are processed and presented using applications such as the browser 155, content readers 154, messaging applications 151, 152, and any other suitable user agent. In particular, the structured documents and applications described herein may conform to known standards for the structure and presentation of content, in particular HTML4 and HTML5, published by the World Wide Web Consortium (W3C) at w3.org. In addition, the within embodiments may comply with companion, alternative, subsequent and predecessor standards and specifications, including without limitation other versions of HTML, XHTML 1.0 and 2.0, DOM Levels 1 through 3, and CSS Levels 1 through 3, also published by the World Wide Web Consortium (W3C) at w3.org.

While the embodiments herein are described primarily with reference to a browser application 155 and to webpages, it will be understood by those skilled in the art that these embodiments are not intended to be so limited, and are applicable to other types of structured documents and applications that generally conform to the embodiments herein. In particular, despite the particular examples of webpages and reference to CSS declarations to define attributes for various content elements, strict adherence to SGML, HTML or CSS standards, and so forth, is not mandatory; these embodiments may be implemented for the purpose of processing any suitable structured document. The structured document may comprise any other suitable data file, whether defined according to an open or proprietary standard, provided the document is capable of being formatted or presented as described herein. A simple example of such a structured document is a formatted text file.

Figure 2:
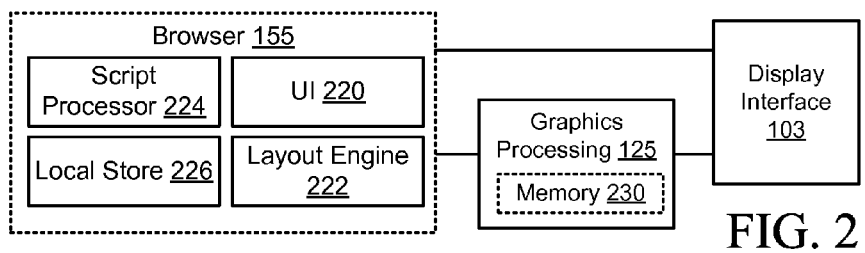
FIG. 2 is a schematic diagram of select components of the electronic device of FIG. 1.

Thus, a structured document, such as a webpage, may be retrieved by the electronic device 100 from memory at the device 100 such as the flash memory 108 or the RAM 106, or over a network connection from a network resource such as a web server. The webpage is then processed for display by the browser application 155. FIG. 2 illustrates select components of an electronic device 100 and of a web browser application 155 that may execute at the electronic device 100 for processing and rendering input webpages and other structured documents. The browser application 155 may include interoperating components such as a user interface engine 220, layout or rendering engine 222, a script processor, plug-in, or virtual machine 224 for executing code snippets, scripts and the like embedded in, received with, or invoked by the webpage being processed. The browser application 155 may also have its own local store 226, allocated to the application 155 from the volatile and/or non-volatile memory 106, 108 of the electronic device 100.

When a webpage is received or retrieved for processing and display, it is processed by the layout engine 222, with any scripts provided for the webpage passed to the script processor 224 for execution. The layout engine 222 parses the webpage to generate rendered document data which is ultimately output, after any further required processing by the main processor 102 or visualization subsystem and/or graphics processor 125, to the display interface 103. Further processing can include the graphics processor 125 compositing image data generated by the layout engine 222, for example in accordance with the process described in U.S. patent application Ser. No. 13/286,581, "Accelerated Compositing of Fixed Position elements on an Electronic Device" filed 1 Nov. 2011, the entirety of which is incorporated herein by reference.

The techniques used by the layout engine 222 to prepare a rendered webpage are generally known in the art. In the embodiments herein, processing the input webpage to generate a rendered document for delivery to the display interface 103 is referred to as "preparing" or "rendering", regardless how the processing of the webpage occurs. Generally, the rendering process includes parsing of the webpage, and construction of one or more models reflecting a hierarchical arrangement of nodes representing the various elements provided in the webpage. A model of the hierarchical arrangement is constructed in memory (e.g., the local store 226), to which model any defined styles are applied to determine the position and appearance of content elements of the webpage in the display view of the browser application 155. The content elements represented by the model, with their position and appearance as determined by the layout engine 222, are then painted to the display 110 via the display processor 103. Styles, scripts and similar data associated with various elements of the webpage and affecting the layout process may be included in the webpage provided to the electronic device 100, although in many cases such information may be provided in a separate file (such as a CSS file) that is identified in the header section of the webpage, and retrieved from the web server by the browser application 155. Alternatively, default styles defined at the browser application 155 may be applied to the webpage elements. When a content element in the webpage has an associated style parameter (either in the webpage itself or in a CSS file identified by the webpage) the style parameter is referred to herein as a style directive.

As noted above, performance on some electronic devices 100 may be adversely affected by relatively intensive processing of input data files for output to the display interface 103 for display. Thus, in mobile devices with limited processing power, it has been found useful to store the rendered webpage as a flat image file in the local store 226. The flat image file is a static "snapshot" of the rendered webpage at that point in time. Additional efficiencies can be realized by tiling the image in a backing store, which can be included in the local store 226. The backing store caches rendered structured document content for display. Implementation of a backing store is described in U.S. Patent Application Publication No. 2010/0281402 filed on 29 Apr. 2010, "Software-based Asynchronous Tiled Backingstore" and U.S. patent application Ser. No. 13/167,512, "Backing Store Memory Management for Rendering Scrollable Webpage Subregions" filed on 23 Jun. 2011, which are incorporated herein by reference.

Whether or not the structured document is rendered by a mobile or non-mobile electronic device, and whether or not a backing store or similar cache is employed, the webpage is displayed in a browser viewport. The viewport, as the area made available by the browser application within which the webpage may be displayed, can be defined by physical limitations such as the operational region of the display 110, as well as also by the physical form factor of the device and the fit of the device chassis around the display 110. The viewport is also constrained by the environment in which the browser 15 is executing. In some examples, the viewport dimensions are the same as the dimensions of the maximum physical display region of the display 110. The viewport may alternatively be defined by a window assigned by the device operating system 134 to the application presenting the webpage for display. The application window may be of variable size, and may be sized to be smaller than the dimensions of the rendered webpage.

In many cases the content of a webpage is in fact greater in dimension than the viewport available for displaying the webpage on the display 110. Thus, only a portion of the content of the webpage may be visible at a given time; typically, the user is able to scroll to those non-visible portions of the webpage. Some browsers 155 and/or associated mobile data servers may compensate for this problem by proactively reducing the display dimensions of the webpage or its components to fit within the bounds of the viewport, either prior to delivery of webpage data to the electronic device 100 or prior to outputting the processed webpage to the display 110, so that when the webpage is displayed on the display 110, scrolling is not required.

However, scaling the webpage in this manner can reduce the display size of the various elements of the webpage below a desirable or legible size. It can also be the case that, even without such pre-processing, the display resolution of the display 110 may render that content illegible or smaller than desired. It may also simply be the case that the user wishes to enlarge a portion of a displayed webpage to inspect it in more detail. In these instances, a zoom or scaling instruction may be invoked to enlarge at least a region of the displayed webpage.

The zoom or scaling instruction can be executed at the electronic device 100 in response to a received user command, which can be input by means of one or more user input devices or interfaces, including without limitation the keyboard 116, display 110 where it includes a touchscreen interface, microphone 120, trackball, buttons, trackpad, scroll wheel, optical joystick, rocker switch, and the like which may be external to or integrated with the electronic device 100. For example, a zoom mode may be entered, and in this mode manipulation of a user input device (such as movement across a trackpad in a particular direction) may be correlated to an increase or decrease in scale. In the case of a system equipped with a touchscreen display adapted to detect and process multitouch gestures, a "pinch" gesture, in which the user touches two fingers to the touchscreen surface and either spreads the fingers or brings them together while maintaining contact with the screen, can be interpreted as a command to enlarge or decrease the currently displayed size of the displayed item. Some scaling commands may include a parameter indicating the degree to which the image is to be enlarged or reduced; the length or duration of the detected touch event, for example, may be correlated to an amount by which the displayed item is to be enlarged or reduced. Variations of zoom commands, and means of detecting such commands by an electronic device, will be known to those skilled in the art.

The scaling command may be applied to a selected or previously designated part of the item displayed on the display 110, whether expressly selected by the user (for example as part of the input command) or not. For example, the scaling command can be initiated by the user moving a displayed cursor over a desired element or region of the displayed item, and actuating the user input device (e.g., clicking a button, pressing down on a trackpad, etc.). These actions may be combined in a single detected touch or gesture, or sequence of touches or gestures (e.g., the user double-tapping on a touchscreen at a position corresponding to a particular element or other point of the displayed item). The selected element or region may then be designated as the centre or target of the scaling process to be executed, and once the displayed item is enlarged (if the scaling command is a command to enlarge the selected element or region) at least part of this selected element or region will remain visible on the display 110.

Figure 3A:
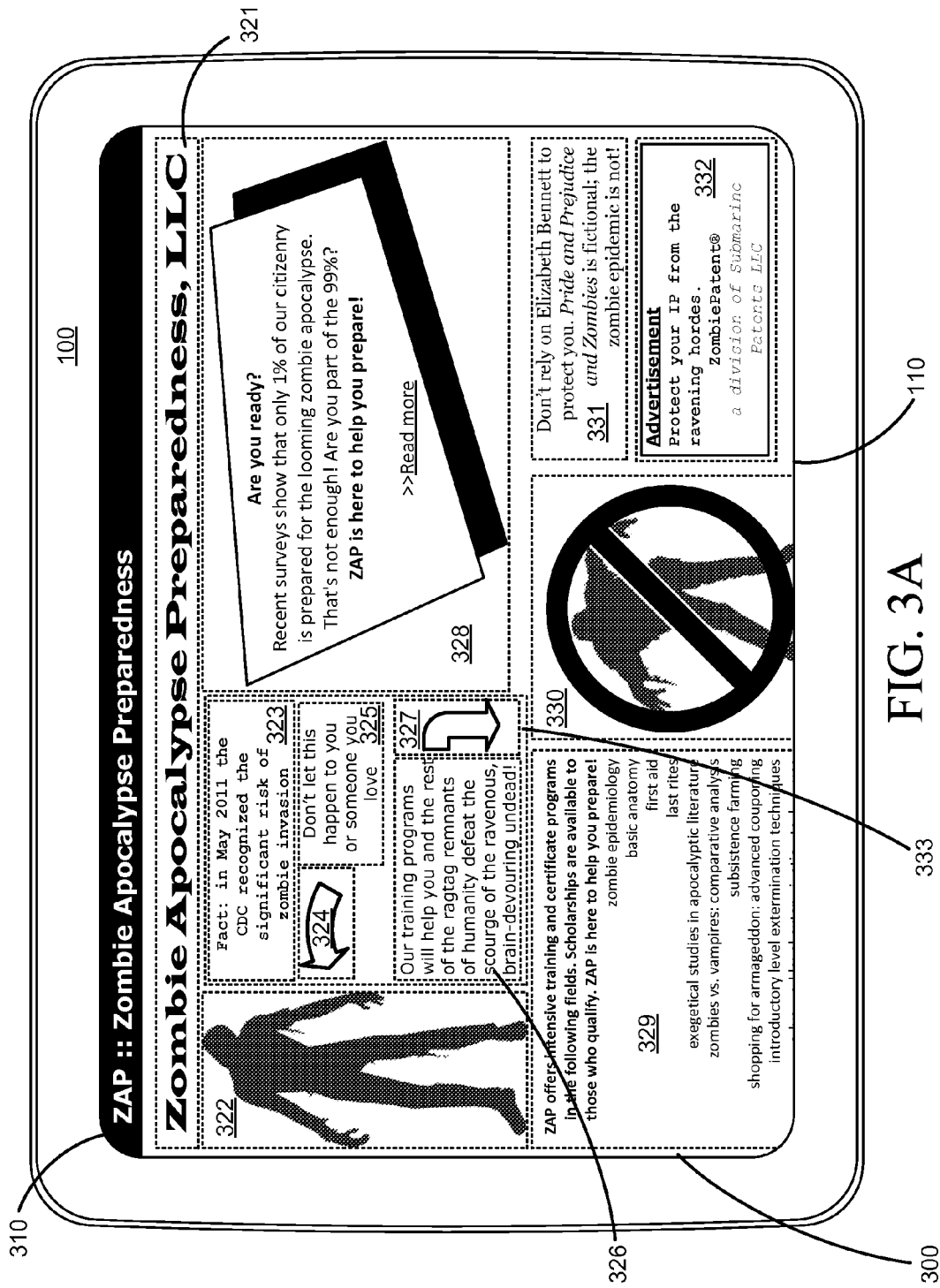
FIG. 3A is an illustration of a structured document displayed on an electronic device display in a first view.

An example of scaling is illustrated in the accompanying figures. FIG. 3A illustrates an example of a webpage or other document displayed on a display 110, which may be integrated with the electronic device 100. A webpage (or other structured document) may include a number of components. The webpage may contain zero, one or more elements including content elements (e.g., text, hyperlinks, graphics, user interface elements, video, animation, and the like, as well as containers for containing one or more of the aforementioned elements). A header section of the document typically contains document parameters and descriptions, scripts, formatting instructions, and other instructions or definitions globally applying to the document. The body typically includes content that is processed for display to the user, in accordance with any applicable instructions or definitions contained in the header, together with other instructions or directives provided in associated files that may be provided to the electronic device 100 together with the webpage document itself.

Instructions or directives may include formatting of text, such as text or font size (which may be expressed a number of ways, for example as a size expressed in points, ems, pixels, and the like) and text and other element alignment. Alignment, in the particular example of a webpage, may be applied specifically to lines of text, as in a paragraph element or heading element. Examples of style directives that can be applied to lines of text in this context include CSS directives defining text alignment attributes such as {text-align: left;}, {text-align: center;}, and {text-align: right;}, which apply a left alignment, center alignment, and right alignment to text content in an element, respectively.

The alignment of an element itself within the document, or within a containing element, may also be specified by instructions or directives. In a webpage, for example, a block element (such as a fixed-width block) or image element may be centered by defining left and right margin attributes with an "automatic" value (such as {margin-left: auto; margin-right: auto;}, which causes the layout engine 222 to compute the left and right margins to be equal, with the result that the element is centered horizontally within the page or containing element. Thus, a block of text, which itself may be aligned in a first mode (e.g., left-aligned), is still centered within a containing element. Thus, a directive or instruction to align an element may do so implicitly by applying values to other attributes of the element.

The above examples do not constitute an exhaustive list of the different means by which the alignment of an element may be defined. As noted above, the embodiments herein are not intended to be limited to webpages; further, other element types to which additional alignment directives may be applied may be available, such as tables and table cells.

Default values for text or other element size and/or alignment may be applied by the browser 155 or other application in the absence of any express instructions or directives provided in or for the webpage or other structured document, or alternatively the browser or other application may be configured to override any instructions or directives provided in favour of default or pre-set formatting.

Apart from element alignment, the direction of content flow within a webpage or other structured document can also be defined explicitly through express directives or implicitly by default. A base directionality value can be established for the entire document (e.g., left-to-right, or right-to-left overall page direction), for example by the HTML directives dir=ltr or dir=rtl. This base directionality value defines the inline direction of text, e.g. whether the text runs from left to right, as in English and other Latin/Indic languages, or from right to left. Similarly, overall block flow (i.e., the direction of flow of subsequent blocks of content, such as subsequent paragraphs) can be specified implicitly or explicitly for the document.

A particular directionality can be applied by default by the browser or other application rendering the webpage if no such overall page direction is explicitly defined for the document. The default value may be determined by localization settings provided for the application. Whether set expressly or by default, overall page directionality can be used to determine the alignment of the rendered document in the viewport when it is initially displayed, as explained below.

The webpage 300 illustrated in FIG. 3A occupies most of the available display area of the display 110 of the electronic device 100. In this example, a title bar 310 is also displayed, which contains content from metadata extracted from the webpage header. The title bar 310 and its contents thus do not form part of the body of the webpage or any of the displayable elements from 321 to 333 described below. The title bar 310 may be displayed by default with every webpage view on the device 100, but in some embodiments, the title bar 310 may be omitted or hidden. However, it will be appreciated that in this case, since the title bar 310 is displayed, the available display area for the webpage 300 in FIG. 3A (in other words, the viewport) is the maximum display area of the display 110 less the area occupied by the title bar 310.

The webpage 300 includes a number of elements of different types, including text elements (e.g., paragraph blocks) 323, 325, 326, 329, 331, 332; headings 321; and images 322, 328, 330. In this example, select elements 323, 324, 325, 326 and 327 are themselves contained within a further element 333, such as a <div> element. The layout of these various elements and their positioning with respect to each other and the available display area within the webpage 300 may be defined by instructions embedded in the webpage itself, or provided in files associated with the webpage (such as CSS files). The same sources may also provide the instructions and directives for alignment and other formatting of the individual elements. As may be seen in FIG. 3A, select elements may contain text or other content that is below a desired size for legibility; for example, the text in text element 329 is visibly smaller than the text of blocks 323 or 326.

Figure 3B:
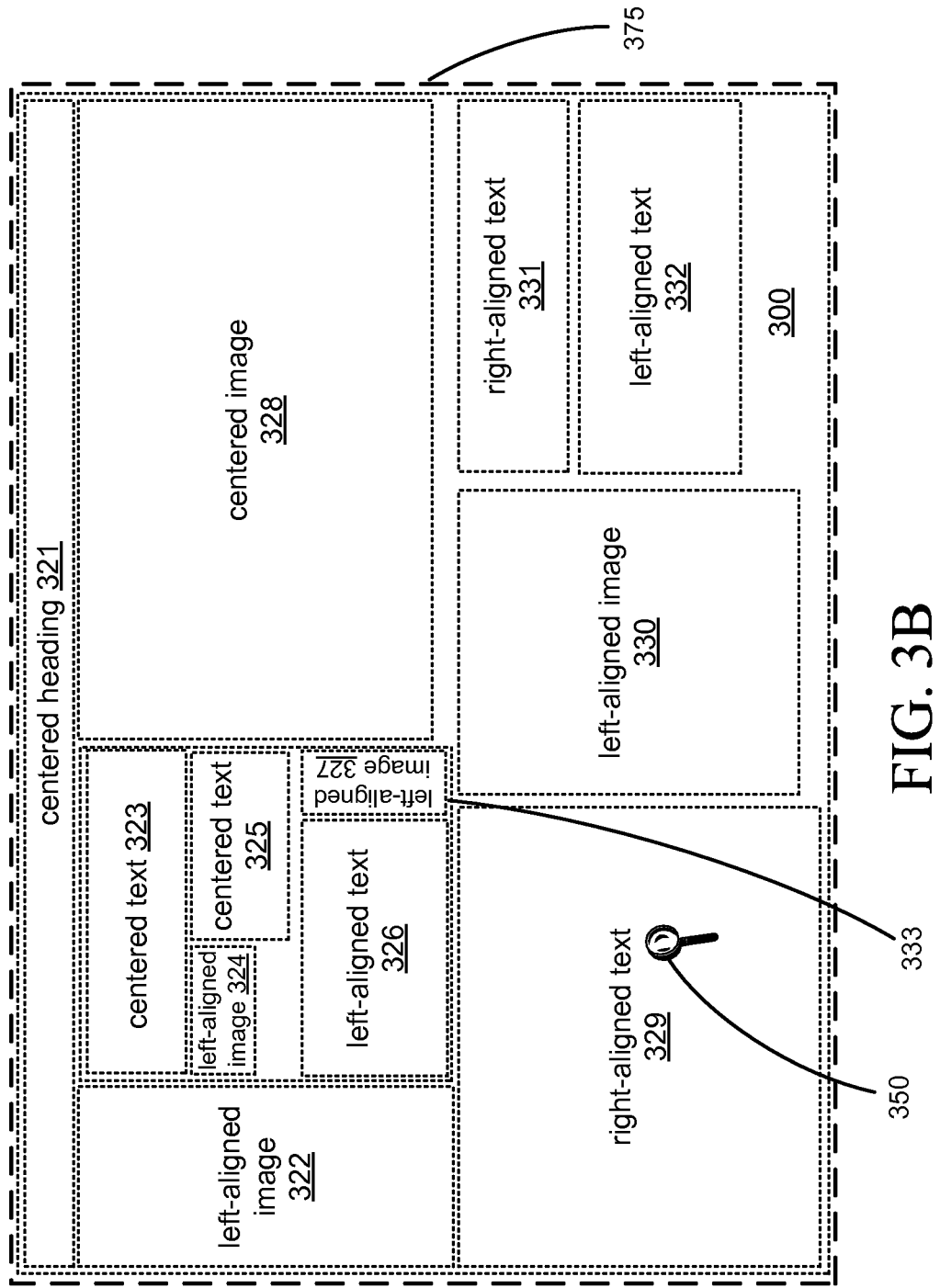
FIG. 3B is a schematic diagram of the structured document of FIG. 3A.

The elements 321-333 of the webpage 300 include content with a number of different alignments of the types described above. Turning to FIG. 3B, a schematic diagram of the same webpage is shown indicating the different alignment types. Images 322 and 330 are left-aligned; the remaining image 328 is centered within a containing element. The position of the container element 333 and the container of the centered image 328, in the same horizontal row as the first left-aligned image 322, with the remaining elements provided in a horizontal row below, may be the result of default flow rules applied when the webpage is rendered. Within the containing element 333, the images 324 and 327 are left-aligned, as is the text block 326. The remaining text blocks or elements 323, 325 are centered. Finally, the text blocks 329 and 331 are right-aligned, while the remaining block 332 is left-aligned text.

The entirety of the webpage 300 in this schematic is encapsulated in rectangle 375, which denotes the available viewport referenced above. The entire viewport, in this example, is filled with a first view of the rendered webpage 300. In this example, the content of the webpage 300 as initially displayed (as in FIG. 3A) fills the width of the viewport 375, and overall page directionality settings (in this example, the overall direction is set expressly or by default as left-to-right) result in aligning viewport so that the viewport's left bound (left-hand edge) is at the left bound (left-hand edge) of the rendered webpage. It should be noted that in the accompanying drawings, the bounds of the viewport 375 do not coincide with the bounds of the webpage 300, and a margin is shown around all elements within the webpage 300. Generally, in these drawings margins have been added to the bounds of select elements and portions so that their bounds or outlines can be more easily distinguished from one another for ease of reference. However, it will be understood by those skilled in the art when those bounds are, or may be considered to be, substantially coincident or aligned, and when it is possible for the bounds to be set apart from each other.

Consider the case where a scaling command is received while the webpage 300 is displayed. The command is represented in FIG. 3B by the magnifying glass icon 350, which may represent a zoom in instruction (the magnifying glass may also represent a zoom out instruction in some embodiments). In FIG. 3B, the icon 350 is positioned over the right-aligned text block 329. In response to the detected scaling command and the selection of this particular element 329, a scaling instruction is invoked at the electronic device 100 for that selected element.

Figure 4A:
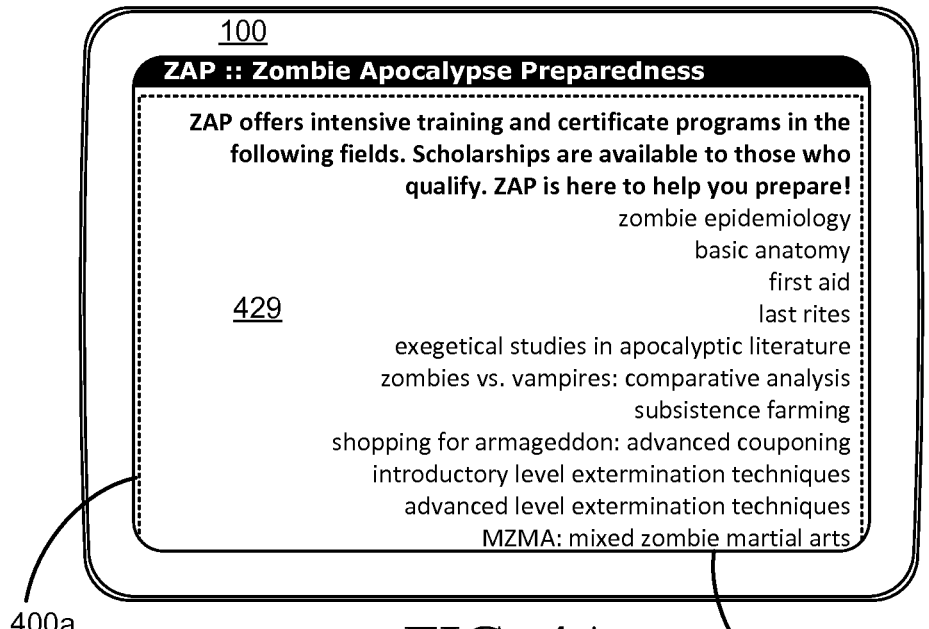
FIG. 4A is an illustration of a portion of the structured document of FIG. 3A scaled to a first size and displayed on the display.

A possible first response to the scaling instruction is illustrated in FIG. 4A, in which only a portion 400a of the webpage 300 is now shown. The single element 329 is enlarged so that its bounds fit the viewport 372 (not shown in FIG. 4A). The enlarged element is indicated as 429. As part of the enlarging process, the text content itself is also enlarged. In these examples of scaling, when the rendered webpage is already stored at the electronic device 100 as an image file, the image can be retrieved and the scaling instruction initially applied to this image file. The data initially outputted to the display interface 103 for display on the display 110 in response to the scaling instruction can be an enlarged view of the image file, which can be retrieved from memory and enlarged relatively quickly for display, thus providing a faster perceived response time to the user. In the meantime, the layout engine 222 may receive a magnification factor or target size for the element 329/429 and can then re-render this portion of the webpage accordingly. When the webpage (or portion thereof) is re-rendered, the newly rendered version may be output to the display interface 103 to replace the zoomed image.

Figure 4B:
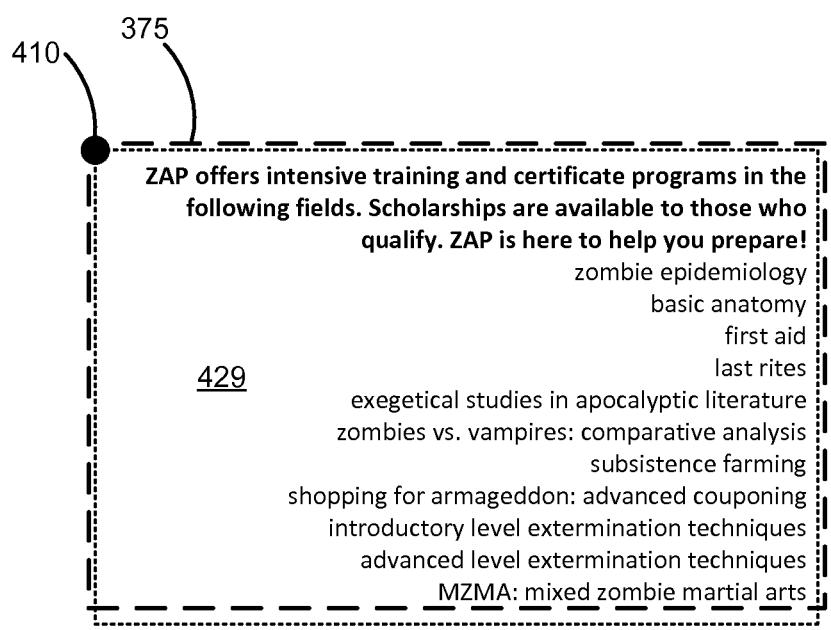
FIG. 4B is a schematic diagram of the portion of FIG. 4A and its position with respect to a viewport.

A schematic representation of the zoomed element 429 is shown in FIG. 4B. As can be seen in this figure, the element 429 is positioned in the viewport 375. As a default setting in response to a zoom-in command, the left-hand side (i.e. the leftmost bound) of the zoomed element 429 is aligned with the left-hand side or bound of the viewport 375, and in particular, the upper left-hand corner of the viewport 375 is aligned with the upper left-hand corner of the element 429, as indicated by point 410. This alignment is consistent with practice adopted to support left-to-right writing systems. In this example, the zoomed element 429 is almost coincident with the viewport 375, since it was adjusted to have a width matching the width of the viewport 375, and because the height of the zoomed element 429 is coincidentally close to the height of the viewport 375. However, in this example, a small portion of the element 429 extends beyond the viewport (at the bottom of the viewport); only that portion that intersects the viewport 375 is actually displayed in FIG. 4A.

Figure 5A:
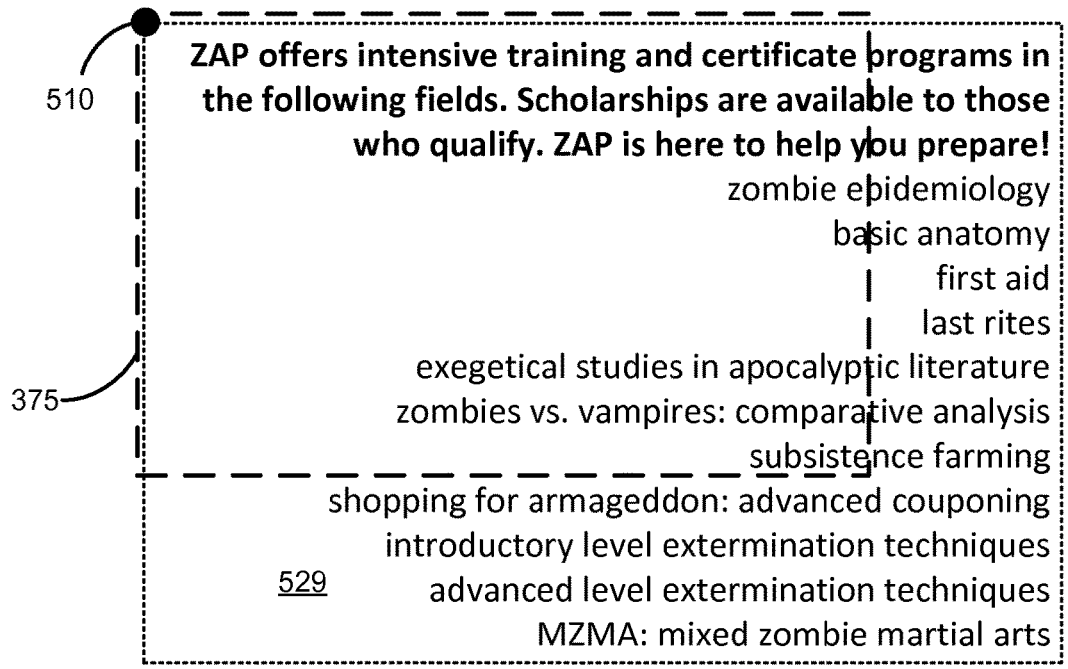
FIG. 5A is a schematic diagram of the portion of the structured document of FIG. 4A scaled to a second size and its position with respect to the viewport.
Figure 5B:
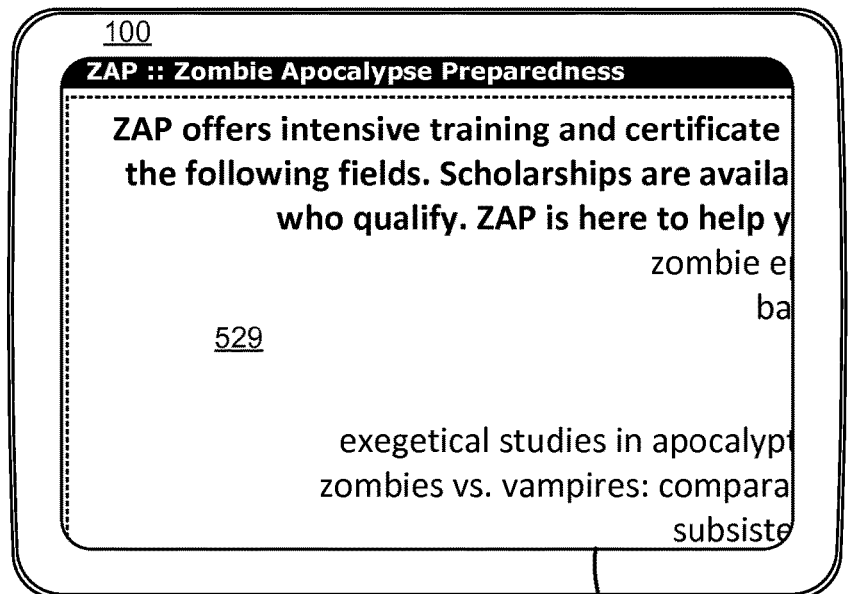
FIG. 5B is an illustration of the scaled portion of FIG. 5A when displayed.

In scaling or zooming the element 329 in this manner, the text size is likewise increased. The increase in text size may be approximately proportional to the increase in element size from 329 to 429. In some cases, however, this level of scaling or zooming is insufficient to render the text at a size that is sufficiently legible. In that case, a further scaling may be applied as shown in FIGS. 5A and 5B. This further scaling may be invoked in response to a further user command, or it may occur automatically upon determination that the initial zoom response was insufficient to enlarge the text to a threshold size. (The threshold or minimum text size may be predetermined in the browser application 155 code, or alternatively may be a user-definable setting.) Thus, the element may be further zoomed to a further enlarged size 529, at which point the text size meets or exceeds a minimum size.

Once again, once the element 529 is scaled as shown in FIG. 5A, the scaled element 529 (and optionally a scaled version of the flat image file generated from the originally rendered version of the webpage 300) is outputted to the display interface 103 for display. Once again, the scaled element 529 dimensions do not match the viewport 375 dimensions; indeed, the element 529 now extends horizontally and vertically beyond the bounds of the viewport 375. Again, only the portion of the element 529 that intersects the viewport 375 will be output to the display 110, as can be seen in FIG. 5B. The portion of the element 529 that intersects the viewport is determined by the alignment or positioning of the viewport 375 with its upper left-hand corner at the upper left-hand corner of the zoomed element 529, as illustrated by point 510.

The consequence of this alignment or positioning of the viewport is that a portion of the text may not be visible when the scaled element is displayed; as can be seen in FIG. 5B, the ends of the text lines extend beyond the display 110, and scrolling would be required in order to display the end of the text. There is thus a trade-off between enlarged text and avoiding the need for horizontal scrolling. Horizontal scrolling requires additional processing time on the part of the electronic device 100.

Figure 6A:
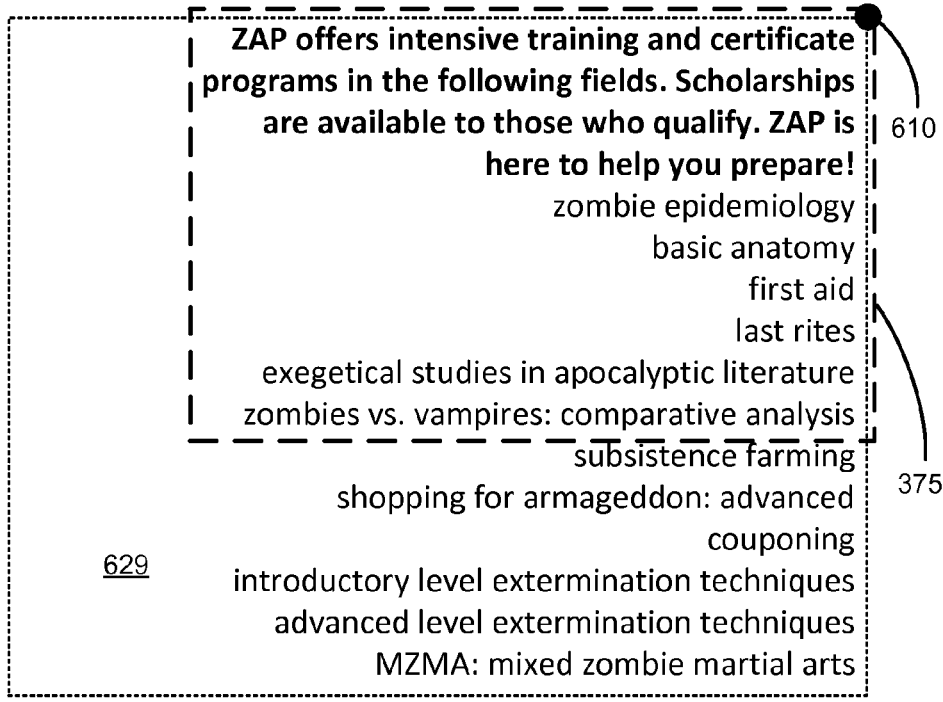
FIG. 6A is a schematic diagram of a further rendering of the scaled portion of FIG. 5A and its position with respect to the viewport.

Accordingly, to reduce the incidence of text lines or other content falling outside the bounds of the viewport 375, the position of the viewport 375 is determined by a dominant alignment of the region selected for the scaling instruction. The region may be an area of predetermined dimension (as will be discussed below with reference to FIG. 7), or may be a single element or group of elements, or portions of an element or elements. In the example of FIGS. 4A through 6B, the region is a single element 329 (as indicated in FIGS. 3A and 3B, illustrating the element 329 at its original size). The dominant alignment of the region is accordingly the dominant alignment of the element 329, as may be determined from the instructions or directives applied to the element to format its contents or its position in the container. In this example, the dominant alignment is right, given that the text content of the element 329 is right-aligned. Therefore, as shown in FIG. 6A, the viewport 375 is positioned so that its rightmost bound matches the rightmost bound of the enlarged element 629, and its upper right-hand corner matches the upper right-hand corner of the element 629, as indicated by point 610.

The dominant alignment may thus result in a different alignment of the viewport 375 on the rendered webpage or region from the original alignment of the viewport on the initial, pre-scaling, display of the webpage. When the webpage was originally rendered and displayed in this example, the position of the viewport 375 on the rendered webpage was defined by aligning the left bounds of the viewport and the webpage in view of the overall directionality settings for the webpage (left-to-right). However, as shown in FIG. 6A, the overall directionality settings for the webpage will not necessarily determine the alignment of the viewport 375 with the enlarged element 629; in FIG. 6A, the right bounds of the viewport and the enlarged element 629 were aligned instead.

Figure 6B:
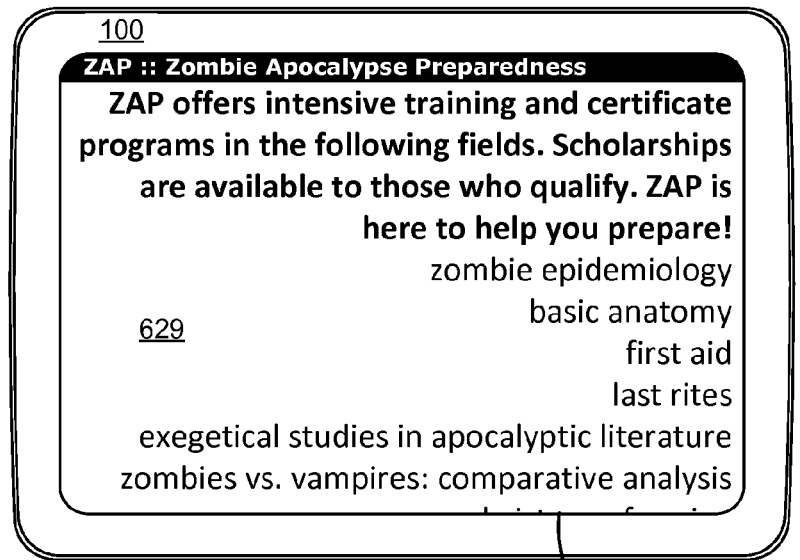
FIG. 6B is an illustration of the portion of FIG. 6A when displayed.

In addition, the text content in the element 629 is reflowed so that it fits within the width of the viewport 375, even though the block in which text can be placed in the element 629 itself has been scaled to a size that exceeds the dimensions of the viewport 375. As a result, the element 629 is resized to a greater height to accommodate the reflowed text, which now occupies more lines than previously. The reflowing of text may be accomplished by the layout engine 222 while re-rendering the webpage or region thereof, using techniques known in the art. Thus, when the portion of the zoomed and reflowed element 629 intersecting the viewport 375 is sent to the display, as can be seen in FIG. 6B the text fits within the horizontal bounds of the display 110, since it now fits without the horizontal bounds of the viewport 375 and the viewport 375 was aligned with the zoomed and reflowed element 629 at the upper right-hand corner 610. Thus, there is no longer any need for the user to scroll content horizontally in order to be able to read the text content of this element.

In the example of FIGS. 5A and 5B, the text was not shown reflowed, although it could have been reflowed in that example; however, it may be noted that even if the text were reflowed in element 529, the ends of the text would still extend beyond the screen because the viewport 375 was aligned with the upper-left hand corner of the element 529. Horizontal scrolling would still be necessary, and indeed a greater amount of blank space would be shown on the screen in FIG. 5B in that case.

While FIGS. 4A and 4B illustrate an initial zoom response resulting in the first zoom size of element 429, it will be understood by those skilled in the art that this interim stage may be bypassed when executing the received command. FIGS. 4A and 4B illustrate, however, that in the event of repeated scaling of a region of a webpage, the dominant alignment need not be applied to the position of the viewport until the element that is the target of the scaling command exceeds the size of the viewport 375.

FIG. 7 illustrates again the schematic representation of the webpage 300, this time with a selected region 700 for zooming that encompasses some elements 326, 327 in their entirety, and other elements 324, 325, 329, 330 (and the container element 333) only in part. This may occur where the icon 350 is positioned such that it is not directly over a specific content element such as a text block or image (or other content, such as embedded content, hyperlink, and the like), but is positioned over the background of the webpage, a containing element, or a margin or region for which no content is defined. The electronic device 100, upon detecting a scaling command referencing such a position as a reference or target for the scaling instruction, may be configured to select a surrounding region as the target. In this example, the selected region is defined such that the icon 350 or reference point is positioned at its center.

In the case of FIG. 7, a determination of the dominant alignment of the selected region may be determined either by identifying a dominant element within the region and assuming that dominant element's alignment as the dominant alignment, or alternatively by identifying a dominant alignment for the entire region itself. In the first case, the dominant element may be determined according to rules setting out a hierarchy of user-relevant content elements; for example, a text element may be considered to be more "important" than an image element, and so the text element would be chosen as the dominant element. The first text element occurring within the region 700 may therefore be chosen as the dominant element. In the example of FIG. 7, the dominant element would be the centered text element 325. The dominant alignment may therefore correspond to the alignment of one or more of a plurality of elements included in the region; at the same time, though, it may not correspond to the alignment of others of the plurality of elements.

Alternatively or in combination with the above rule, the dominant element may be defined as the first element within the hierarchical arrangement of elements within the webpage that is completely contained within the region 700. In this example, the first element completely contained within the region 700 is the left-aligned text block 326.

Still a further rule may be to select the single element that is closest to the reference point (i.e., the center of the region 700), optionally with preference given to text content. Other rules and algorithms for identifying a dominant element within the region 700 will be known to those skilled in the art. For example, each of the content elements within the region may be assessed according to valuation rules used to determine the "meaningfulness" of the content; a paragraph of text, for example, may be considered to be more meaningful to a user than a small image, or a series of hyperlinks. The element with the most "meaningful" content would then be selected as the dominant element. In a further example, one or more elements within the document can be expressly identified as a "dominant" or "important" element through a specific attribute set for that element, or another element attribute used to define a relative stacking or navigation order of the element within the document may be used to identify the dominant element. For example, if a tabindex value (which is used to set the tab or navigation order of elements within an HTML document) is set for one or more elements within the region 700, that element with the lowest value may be selected as the dominant element.

Alternatively, a dominant alignment for the region may be identified. This may be accomplished by simply determining which alignment type is most prevalent in the elements captured in whole or in part in the region 700. Prevalence may be assessed by a simple count of the number of instances of left-, right- and center alignment, or may in some cases be weighted according to the type of content (text content may be weighted more than image content).

However the dominant alignment is determined—either as the alignment of the element identified as dominant, or as an overall alignment of the entire region—the dominant alignment is used to determine the alignment of the viewport 375 with the scaled region 700. If the dominant alignment is a right alignment (as may be the case with right-to-left direction text or an express or implied directive for right alignment, then the viewport is aligned at its upper right-hand corner with the upper right-hand corner of the scaled region 700. If the dominant alignment is a left alignment (which is frequently a default alignment), then the viewport is aligned at its upper left-hand corner with the upper left-hand corner of the scaled region 700. If the dominant alignment is centered, then the viewport is aligned such that the center of its upper bound is coincident with the center of the upper bound of the scaled region 700.

Typically, the formatting of element content is such that the content is positioned at the top or relative to the top of the element; hence the alignment of the viewport with the upper corners or upper bound of the scaled region 700. In some embodiments, the dominant alignment may include a vertical component, such as top, middle, or bottom; vertical alignment can also be defined in instructions or style directives provided for the webpage. In that case, the alignment of the viewport may be determined accordingly, and other appropriate viewport alignments may include bottom-right, bottom-left, bottom-center (i.e., points along the bottom bound of the viewport and scaled element), and middle-right, middle-left, and middle-center (i.e., points along the vertical midpoint of the viewport and scaled element).

Figure 8C:
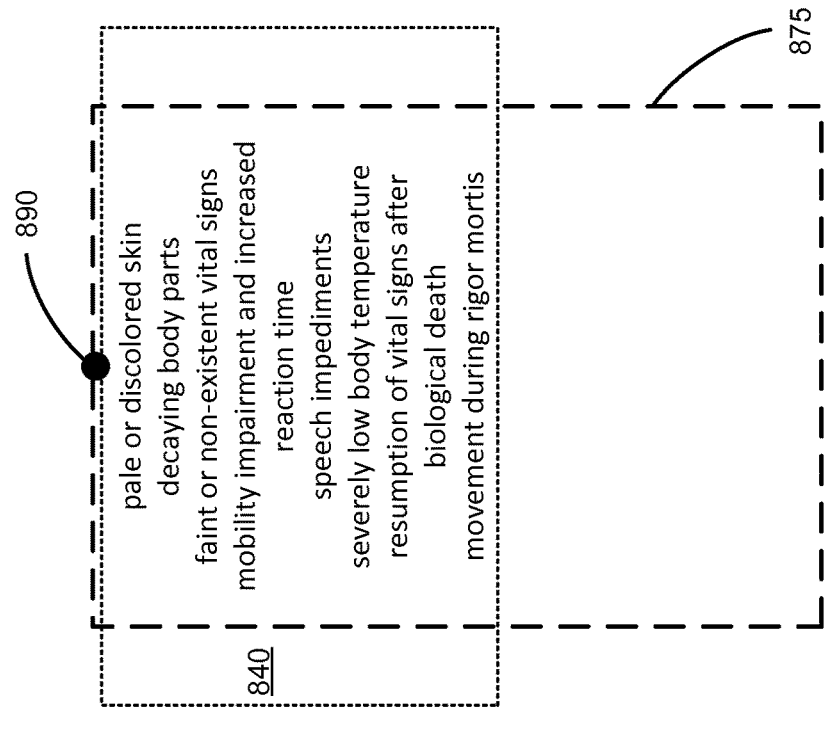
FIG. 8C is a further schematic of the region of FIG. 8B, and its position with respect to the viewport.
Figure 8B:
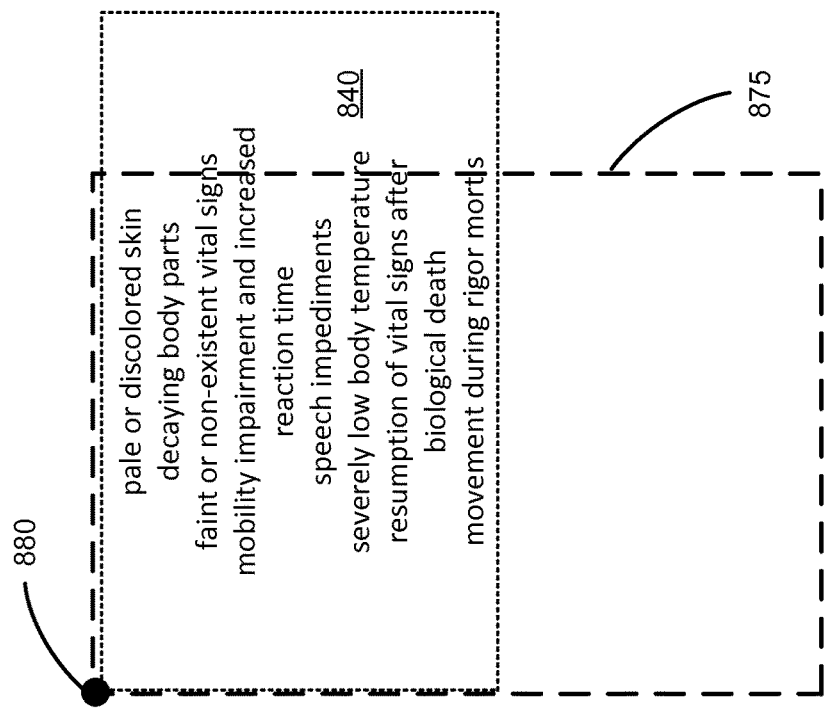
FIG. 8B is a schematic of a region of the structured document of FIG. 8A when enlarged, and its position with respect to a viewport.

FIGS. 8A to 8C illustrate an example where the alignment is centered in an embodiment of a portrait-oriented display, rather than the landscape-oriented display of FIGS. 3A-7. The webpage 800 displayed in the display 110 includes three text blocks 810, 820, 830; element 830, in particular, includes centered text. As indicated by the icon 350, this latter element is also selected in association with a scaling command.

FIG. 8B illustrates an effect of enlarging the element 830 to zoomed element 840, which includes text with a larger font size, and still centered. In this example, the enlarged text has also been reflowed to fit with the horizontal bounds of the viewport 875. However, as can be seen in FIG. 8B, the viewport 875 is aligned with the element 840 at their upper left-hand corners as indicated by point 880. As a result, even thought the text content is in fact sized and reflowed to fit within the viewport 875, the text actually runs beyond the bounds of the viewport 875. However, when the dominant alignment of the element is determined (i.e. centered), the viewport may be aligned such that the center point of its upper bound matches the center point of the element's upper bound, as indicated by point 890; the entirety of the enlarged text content now fits within the horizontal bounds of the viewport 875. When the portion of the zoomed element 840 intersecting the viewport 875 is displayed, horizontal scrolling is not required to view all the text content.

Figure 9:
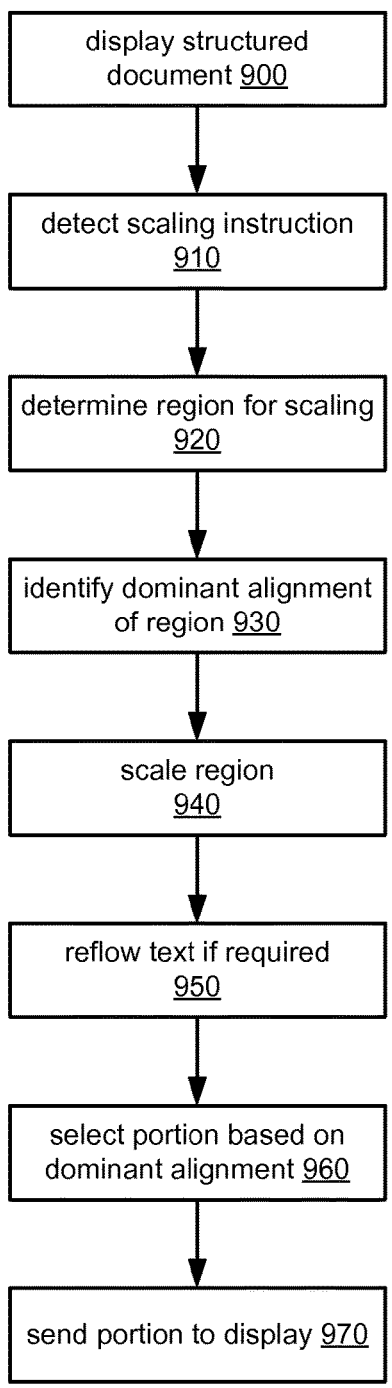
FIG. 9 is a flowchart illustrating a method of scaling a structured document for display.
Figure 10:
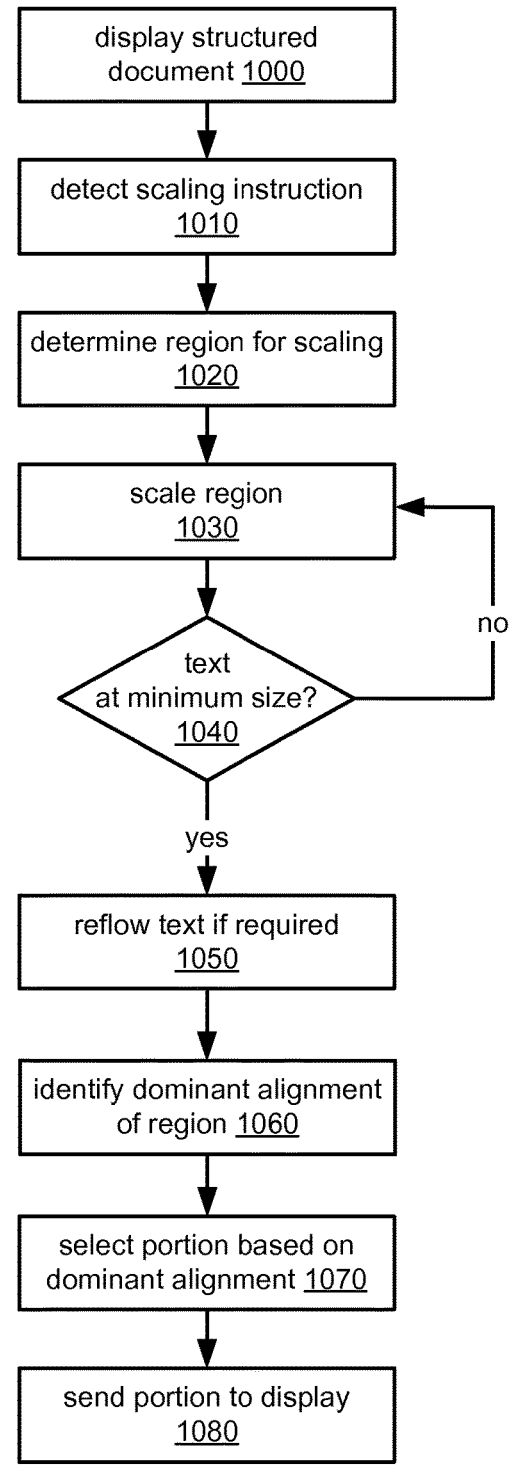
FIG. 10 is a flowchart illustrating a further method of scaling a structured document for display.

FIGS. 9 and 10 illustrate methods that may be followed in accordance with the embodiments described above. Turning first to FIG. 9, at 900 a structured document (such as a webpage) is displayed. This initial display of the structured document may be at its original, scaled size (i.e., a default magnification of 100%) or at a default scaled size other than the original size. Initially, when the document is displayed, the viewport is aligned with the document according to an initial setting. For example, where localization settings prescribe a default left-to-right text direction, or express directives set a left-to-right text direction, at 900 the structured document is initially displayed so that the document's left-hand bound is aligned with the left-hand side of the viewport. The bounds of the structured document may also be aligned with other bounds of the viewport as appropriate in dependence on the overall page directionality of the document. At 910, a zoom or scaling instruction is detected. At 920, the region for scaling is determined; as noted above, this region may comprise a single element, a group of elements, or a number of elements and/or portions of elements. At 930, a dominant alignment of the region is determined, and then the region is scaled at 940. Any text content within the element(s) of the region may then be reflowed if necessary at 950, and then a portion of the scaled region is selected for display based on the dominant alignment thus determined at 960. This portion of the scaled region is, as described above, determined based on the position of the viewport when aligned with the scaled region according to the dominant alignment, and as noted above, the alignment of the viewport on the scaled region may not be the same as the initial alignment of the viewport on the structured document as initially displayed at 900. Finally, at 970, the portion of the scaled region is sent for display.

FIG. 10 illustrates a method where there may be one or more intermediate iterations of scaling before a final scaled size is determined. Again, at 1000 a structured document is displayed. At 1010, a zoom or scaling instruction is detected. At 1020, the region for scaling is determined, and the region is scaled at 1030. Next, at 1040, it is determined whether any text contained in the region is at a required minimum size. If it is not, the scaling instruction is repeated. If the text is at a minimum size, then it is reflowed as necessary at 1050. The dominant alignment of the region is then determined at 1060; the flowcharts of FIGS. 9 and 10 thus illustrate that the order of select steps in these methods need not follow the order depicted in the drawings. The portion of the scaled region is selected for display based on the dominant alignment thus determined at 1070 as described above, and finally this portion is sent to the display at 1080.

As explained above, the embodiments herein should not be construed as being limited to webpages or requiring strict compliance with webpage-related standards. Further, those skilled in the art will appreciate that a layout engine as contemplated above may be invoked by other applications on the electronic device 100 that process structured documents for display. In addition, although the examples provided above were directed to text elements, it will be understood that the same principles may be applied to other types of content elements that are subject to alignment (either implied or expressly set), such as images, videos, and the like.

The description above provided the examples of a structured document or element having a typical English-language left-to-right inline content (text) direction and top-to-bottom inline progression and block flow (i.e., lines within a paragraph flowing from the top to the bottom of an element, and paragraphs flowing from the top to the bottom of the page). Different writing modes can involve different inline content directions and inline progression and block flow; for example, Arabic-based writing systems typically use a right-to-left inline content direction with top-to-bottom progression and block flow, while other writing systems (e.g., Mongolian and Han based systems) use a top-to-bottom inline direction combined with either a left-to-right or right-to-left progression and block flow. Those skilled in the art will understand that the examples provided above can be applied to documents or elements defined with different text directions or flow according to different writing systems; the inline content direction defined for the document may be used to determine the initial positioning of the viewport when the document is initially displayed.

There is thus provided a method implemented by an electronic device, the method comprising: receiving an instruction to scale a region of a displayed structured document, the region including at least one element or a portion thereof; in response to the received instruction: identifying a dominant alignment of the region; scaling the region; and outputting to a display interface a portion of the scaled region intersecting a viewport defined for a display, the viewport being aligned with the scaled region according to the dominant alignment.

In one aspect, when the structured document is initially displayed, the viewport is aligned with the structured document according to an initial alignment different from the alignment of the viewport with the scaled region.

In another aspect, wherein the dominant alignment is an alignment of a dominant element of the at least one element or portion thereof.

In a further aspect, identifying the dominant alignment comprises identifying the dominant element according to a hierarchy of elements or an attribute of the dominant element.

In yet another aspect, the region comprises a plurality of elements or portions of elements, and identifying the dominant alignment comprises determining a prevalent alignment among the plurality of elements or portions of elements.

In still another aspect, the dominant alignment is determined by a text alignment.

Still further, scaling the region may comprise magnifying the region, and may further comprise increasing a text size of text content of the at least one element or portion thereof, and/or reflowing the text content to fit within bounds of the viewport.

In another aspect, the instruction includes an indication of the region to be scaled.

In these examples, the structured document can be a webpage; the dominant alignment can be either a right alignment or a center alignment; and/or the viewport can be defined as either a maximum physical display region of the display or an application window displayed on the display.

There is also provided a method implemented by an electronic device, the method comprising: receiving an instruction to display a structured document, the structured document including at least one element and comprising left-to-right direction text; rendering the structured document or a portion thereof for display; outputting to a display interface that portion of the rendered structured document or region intersecting a viewport defined for a display, the viewport being aligned with the rendered structured document or portion thereof according to an initial alignment determined for the structured document; receiving an instruction to scale a region of the displayed structured document or portion thereof, the region including at least one element comprising text content, the instruction defining the region; identifying a dominant alignment of the region, the dominant alignment being determined by an alignment of the text content, the dominant alignment being either right-aligned or centered; scaling the region; reflowing the text content to fit within bounds of the viewport; and outputting to the display interface a portion of the scaled region intersecting the viewport, the viewport being aligned with the scaled region according to the dominant alignment such that this alignment of the viewport is different from the alignment of the viewport according to the dominant alignment. In one aspect thereof, the bounds are left and right bounds of the viewport. It will be appreciated that other variations and examples such as those described above may be included in this method.

There is also provided an electronic device adapted to implement the above-described methods and variations. In some examples the electronic device includes hardware modules, software modules, or a combination thereof for implementing the various features of these methods and variations, such as a display module, communication module, processing module, and so forth. For example, the electronic device may include: a display interface; and a processor in communication with the display interface, the processor being capable of: receiving an instruction to scale a region of a displayed structured document, the region including at least one element or a portion thereof; in response to the received instruction: identifying a dominant alignment of the region; scaling the region; and outputting to the display interface a portion of the scaled region intersecting a viewport defined for a display, the viewport being aligned with the scaled region according to the dominant alignment. The processor may thus be adapted to carry out the various further examples and variations described above.

There is also provided an electronic device or computer-readable medium, which may be physical or non-transitory, bearing code which, when executed by an appropriate device, causes the device to implement the methods and variations described herein.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as engines, modules or applications, in order to more particularly emphasize their potentially independent implementation and operation, but these terms are used interchangeably unless otherwise specified. It is also noted that an engine, application, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rightsholder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method implemented by an electronic device, the method comprising:
   receiving an instruction to scale a region of a displayed structured document, the region including at least one element or a portion thereof;
   in response to the received instruction:
      identifying a dominant alignment of the region, the dominant alignment being an alignment of a dominant image in the region or an alignment of text within a dominant text block in the region;
      scaling the region; and
      outputting to a display interface a portion of the scaled region intersecting a viewport defined for a display, the viewport being aligned with the scaled region according to the dominant alignment when it is intersected with the scaled region.

2. The method of claim 1, wherein when the structured document is initially displayed, the viewport is aligned with the structured document according to an initial alignment different from the alignment of the viewport with the scaled region.

3. The method of claim 1, wherein identifying the dominant alignment comprises identifying a dominant element according to a hierarchy of elements or an attribute of the dominant element.

4. The method of claim 1, wherein the region comprises a plurality of elements or portions of elements, and identifying the dominant alignment comprises determining a prevalent alignment among the plurality of elements or portions of elements.

5. The method of claim 1, wherein the dominant alignment is determined by a text alignment.

6. The method of claim 1, wherein scaling the region comprises magnifying the region.

7. The method of claim 1, wherein scaling the region includes increasing a text size of text content of the at least one element or portion thereof.

8. The method of claim 7, wherein scaling the region further includes reflowing the text content to fit within bounds of the viewport.

9. The method of claim 1, wherein the instruction includes an indication of the region to be scaled.

10. The method of claim 1, wherein the structured document is a webpage.

11. The method of claim 1, wherein the dominant alignment is either a right alignment or a center alignment.

12. The method of claim 1, wherein the viewport is defined as either a maximum physical display region of the display or an application window displayed on the display.

13. A method implemented by an electronic device, the method comprising:
   receiving an instruction to display a structured document, the structured document including at least one element and comprising left-to-right direction text;
   rendering the structured document or a portion thereof for display;
   outputting to a display interface that portion of the rendered structured document or region intersecting a viewport defined for a display, the viewport being aligned with the rendered structured document or portion thereof according to an initial alignment determined for the structured document;
   receiving an instruction to scale a region of the displayed structured document or portion thereof, the region including at least one text block comprising text content, the instruction defining the region;

identifying a dominant alignment of the region, the dominant alignment being an alignment of the text content within the at least one text block, the dominant alignment being either right-aligned or centered;

scaling the region;

reflowing the text content to fit within bounds of the viewport; and outputting to the display interface a portion of the scaled region intersecting the viewport, the viewport being aligned with the scaled region according to the dominant alignment when it is intersected with the scaled region such that the alignment of the viewport according to the dominant alignment is different from the initial alignment of the viewport.

14. The method of claim 13, wherein the bounds are left and right bounds of the viewport.

15. An electronic device, including:

a display interface; and a processor in communication with the display interface, the processor being capable of:

receiving an instruction to scale a region of a displayed structured document, the region including at least one element or a portion thereof;

in response to the received instruction:

identifying a dominant alignment of the region, the dominant alignment being an alignment of a dominant image in the region or an alignment of text within a dominant text block in the region;

scaling the region; and outputting to the display interface a portion of the scaled region intersecting a viewport defined for a display, the viewport being aligned with the scaled region according to the dominant alignment when it is intersected with the scaled region.

16. The electronic device of claim 15, wherein when the structured document is initially displayed, the viewport is aligned with the structured document according to an initial alignment different from the alignment of the viewport with the scaled region.

17. The electronic device of claim 15, wherein identifying the dominant alignment comprises identifying a dominant element according to a hierarchy of elements or an attribute of the dominant element.

18. The electronic device of claim 15, wherein the region comprises a plurality of elements or portions of elements, and identifying the dominant alignment comprises determining a prevalent alignment among the plurality of elements or portions of elements.

19. The electronic device of claim 15, wherein the dominant alignment is determined by a text alignment.

20. The electronic device of claim 15, wherein scaling the region comprises magnifying the region.

21. The electronic device of claim 15, wherein scaling the region includes increasing a text size of text content of the at least one element or portion thereof.

22. The electronic device of claim 21, wherein scaling the region further includes reflowing the text content to fit within bounds of the viewport.

23. The electronic device of claim 15, wherein the instruction includes an indication of the region to be scaled.

24. The electronic device of claim 15, wherein the structured document is a webpage.

25. The electronic device of claim 15, wherein the dominant alignment is either a right alignment or a center alignment.

26. The electronic device of claim 15, wherein the viewport is defined as either a maximum physical display region of the display or an application window displayed on the display.

27. An electronic device, including:

a display interface; and a processor in communication with the display interface, the processor being capable of:

receiving an instruction to display a structured document, the structured document including at least one element and comprising left-to-right direction text;

rendering the structured document or a portion thereof for display;

outputting to a display interface that portion of the rendered structured document or region intersecting a viewport defined for a display, the viewport being aligned with the rendered structured document or portion thereof according to an initial alignment determined for the structured document;

receiving an instruction to scale a region of the displayed structured document or portion thereof, the region including at least one text block comprising text content, the instruction defining the region;

identifying a dominant alignment of the region, the dominant alignment being an alignment of the text content within the at least one text block, the dominant alignment being either right-aligned or centered and different from the initial alignment;

scaling the region;

reflowing the text content to fit within bounds of the viewport; and outputting to the display interface a portion of the scaled region intersecting the viewport, the viewport being aligned with the scaled region according to the dominant alignment when it is intersected with the scaled region such that the alignment of the viewport according to the dominant alignment is different from the initial alignment of the viewport.

28. The electronic device of claim 27, wherein the bounds are left and right bounds of the viewport.

* * * * *